United States Patent [19]
Protz

[11] 4,054,058
[45] Oct. 18, 1977

[54] DEVICE FOR INDICATING DIRECTION OF BAROMETRIC PRESSURE TRENDS

[76] Inventor: John Protz, 376 S. Walnut St., Blairsville, Pa. 15717

[21] Appl. No.: 755,955

[22] Filed: Jan. 3, 1977

[51] Int. Cl.² .............................................. G01L 7/12
[52] U.S. Cl. ................................................... 73/386
[58] Field of Search ................. 73/386, 387, 385, 384; 116/114 PV

[56] References Cited

U.S. PATENT DOCUMENTS 2,007,680  7/1935  Hanscom .............................. 73/386

FOREIGN PATENT DOCUMENTS 1,943,083  3/1971  Germany .............................. 73/386
1,948,764  4/1971  Germany .............................. 73/386

*Primary Examiner*—Donald O. Woodiel
*Attorney, Agent, or Firm*—Jon M. Lewis

[57] ABSTRACT

Direction of barometric pressure trend is portrayed by my invention. Changes in barometric pressure are amplified by a linkage member and converted into a signal by trend means to discern an increase or decrease in trend. Motor means receives the signal from trend means and activates display means to show the direction of barometric pressure trend.

9 Claims, 4 Drawing Figures

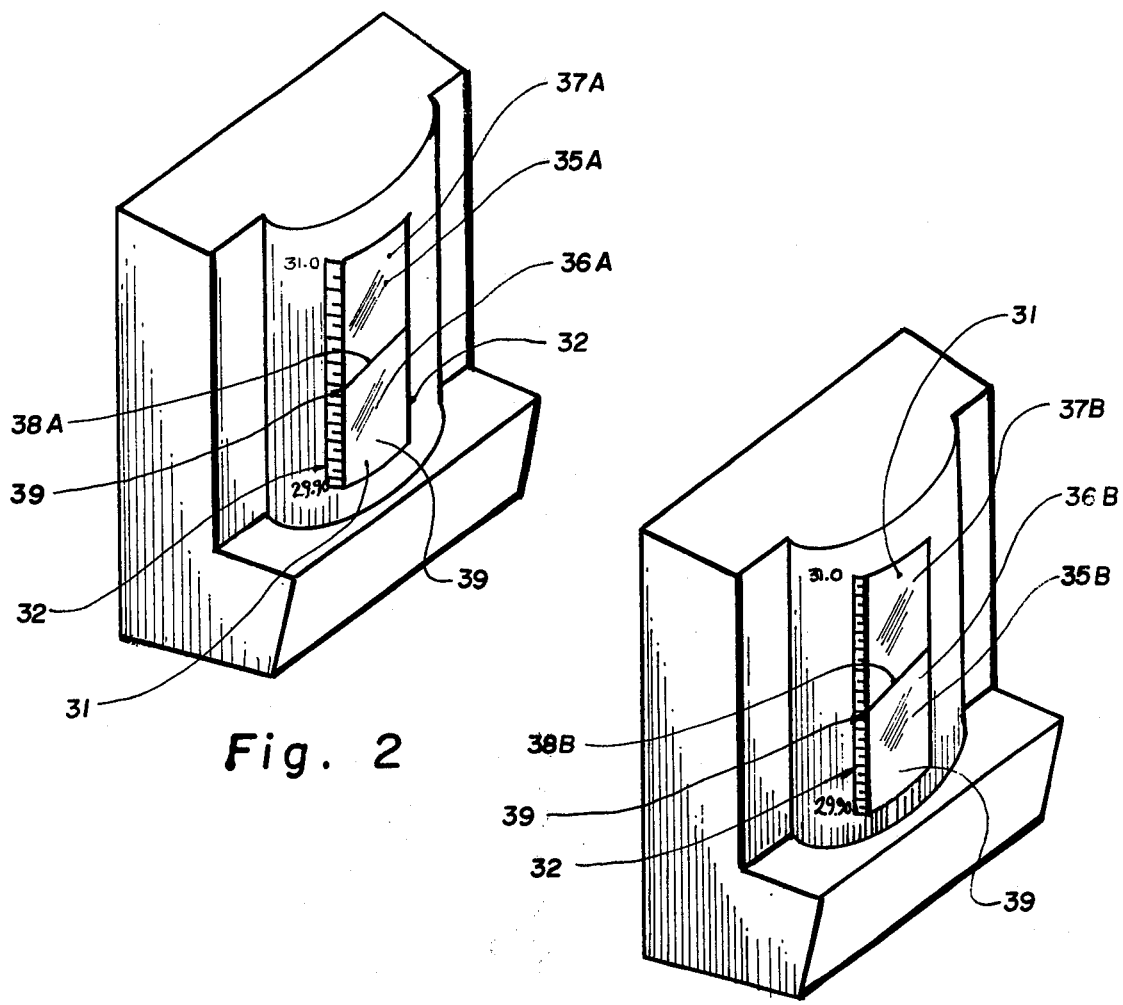
Fig. 2
Fig. 3
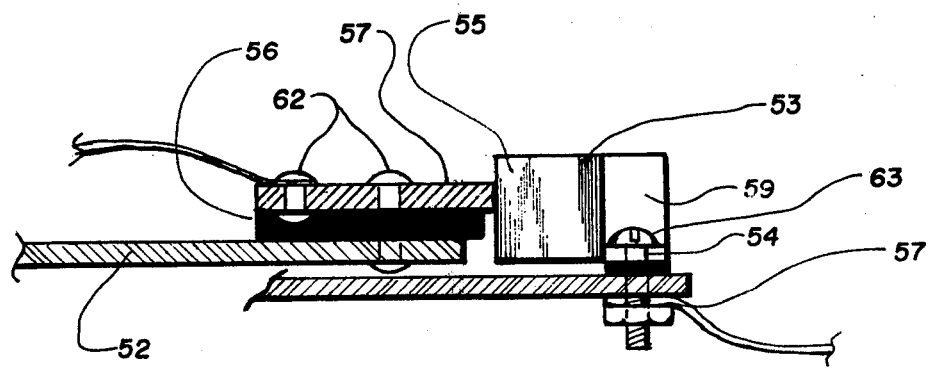
Fig. 4

DEVICE FOR INDICATING DIRECTION OF BAROMETRIC PRESSURE TRENDS

BACKGROUND OF INVENTION

1. Field of Invention

This invention discloses a novel device for indicating direction of barometric pressure trends. My invention may also be used to indicate actual barometric pressure.

Barometric pressure relates to the measurement of atmospheric pressure. When the barometric pressure changes, there is a corresponding relationship between that change and the type of weather approaching.

Generally as the barometric pressure falls from a high pressure to a low pressure, it becomes evident that poor weather is approaching. Likewise, as barometric pressure increases from the low pressure to a high pressure, usually better weather is approaching. My invention specifically relates to the art of indicating to a casual viewer whether the barometric pressure trend is increasing or decreasing.

2. Description of Prior Art

Many people look at a barometer to follow its trend. One difficulty of following conventional barometer is that one must remember what the previous pressure was in order to determine the barometric pressure trend. The most widely used prior art trend indicating barometric device provides a pointer or index in connection with an aneroid barometer. The index is adapted to travel over a dial or scale plate with which is associated a reference pointer. The reference pointer is arranged to be set by hand to register or coincide with the indicating pointed when desired. The reference pointer remains stationary while the index pointer travels. Thus when set, one can observe the scale. The reference pointer indicates the initial starting point. For example, see U.S. Pat. No. 1,632.736.

The prior art devices disclose generally hand operated indexes that remain stationary. These type of prior art devices are not very advantageous to the general public because they require the user to constantly change the reference pointer and then wait for the index pointer to move. Once movement took place, then the user could notice the trend by differentiating whether the travelling pointer went above or below the stationary index on the scale. A great disadvantage of this mechanically hand operated system is the requirement to constantly move the stationary index. If one would forget to move it, any subsequent viewing for determining trend lacks accuracy, since trend changes corresponding of passage of time.

My invention is distinguishable over the prior art in that my invention indicates the direction of barometric pressure trend automatically. My invention may indicate changes at least as low as 1/100th of an inch of mercury. Further, my invention readily indicates to the casual observer the direction of the barometric pressure trend.

SUMMARY OF INVENTION

My invention relates to a device for indicating direction of barometric pressure trends. This invention indicates the direction of barometric pressure trend to the casual observer. By viewing my invention, the observer determines whether increasing or decreasing barometric pressure trend is in progress.

My invention provides for measuring barometric pressure by using barometric measuring means such as metallic bellows for sensing barometric pressure changes. In the preferred embodiment, the metallic bellows has a spring placed inside a sealed internal portion while an external portion is exposed to the atmosphere.

Changes in barometric pressure are then amplified by a linkage member such as a combination of a first link connected to the means for measuring barometric pressure, second link pivotly attached to one end of the first link and connected to a fixed pivot point, and a third link. The three link system with a fixed pivot point on the second link provides a sufficient amplification of the change in length of the metallic bellows to adequately operate my invention.

Trend means for determing barometric pressure trend is controlled by the linkage to create a signal every time barometric pressure changes to indicate the direction of the trend. The trend means is connected to the third link and translates the amplified change in barometric pressure to an increase or decrease in barometric pressure trend. The trend means may also indicate the exact barometric pressure.

In the preferred embodiment, the trend means comprises a rocker bar having a pivotal point at its center and a first and second arm member to either side of the center. The rocker bar is connected to the linkage member and connectable to an electrical power source. The pivotal point rests upon a sliding surface to permit relatively friction free movement about the pivotal point. A first contact panel and a second contact panel are provided, each divided into contact points. It is preferable that each point represents 1/100th of an inch of mercury increase in barometric pressure between 29.5 inches and 30.5 inches of mercury. Generally, barometric pressure when adjusted to sea level reads between the above described points.

The rocker bar slides about the pivotal point and responds to the action of the third link. During decreasing barometric pressure the second arm rests on the second contact panel while during increasing barometric pressure the first arm rests on the first contact panel. The rocker bar is connectible to a motor and is manufactured out of an electrically conductible material. When an arm rests upon a contact point, an electric current is free to pass from the contact point to the arm and through the rocker bar to send a signal to the arm and through the rocker bar to send a signal to the motor indicating the direction of trend of barometric pressure as well as indicating the actual barometric pressure.

The direction of barometric pressure trend is shown to the casual viewer by display means. In the preferred embodiment, the display means is a cylinder situated behind a rectangular window. The cylinder is divided into two equally horizontally portions. The first portion has two color bars to represent increased trend while the second portion has two color bars to represent decreased trend. The first portion has preferably a blue bottom portion separated from a white top portion by a first slant line running from the lower end to the upper end of one portion of the cylinder. The second portion has a white bottom portion separated from a red top portion by second slant line running from the lower end to the upper end. A shaft is secured to the cylinder in order that it may be rotated. When viewing through the window, if the top of the window shows red and bottom white a falling barometric pressure trend is in progress. When the top portion of the window shows white and bottom blue an increasing barometric pressure trend is in progress. One side of the window may be calibrated so that the first slant line and second slant line reflect the actual barometric pressure at the intersection with the calibrated side of the rectangular window.

Motor means translates the signal from the trend means to energize display means so that the display means indicates the direction of trend of barometric pressure. In the preferred embodiment, a motor is connected to the shaft in order to rotate the shaft with cylinder, connectable to a power source, and electrically connected to the rocker arm. A slide switch rotor is mounted on the shaft to direct the operation of the motor. A rotatable disc is attached to the shaft and connectable to the power source. Stationary spring loaded electrical contacts are placed on a mount surrounding the disc and placed in contact with the disc. Each spring loaded electrical contact is connected to a contact point on the first contact panel or the second contact panel.

An insulator is placed on the disc in a manner to break the circuit between the disc and that spring loaded electrical contact energized when an arm of the rocker bar rests on the contact point connected to such spring loaded electrical contact.

In operation, when the arm of the rocker bar moves to a new contact point, current passes from the power source through the disc, then that spring loaded electrical contact connected to the contact point upon which the rocker bar arm rests, through the rocker arm to the motor means whereupon the motor rotates the shaft with cylinder. The insulator on a disc moves until it comes in contact with such spring loaded electrical contact whereupon, the circuit is broken and motor is stopped. Inasmuch as the cylinder is connected to the shaft, it stops to indicate the trend of barometric pressure corresponding to the contact point upon which an arm of the rocker bar rests.

To prevent inertial drift of the motor when it is stopped, a ground contact is placed on top of the insulator and electrically connected to a collar mounted on the shaft. The collar rotates along with the shaft. The collar is electrically connected to stationary arm. Stationary arm is electrically connected to motor such that when circuit is completed with an energized stationary spring loaded electrical contacts, the motor is shorted out to stop suddenly.

It is thus an object of my invention to provide for a method of indicating the direction of barometric pressure trends wherein changes in barometric pressure are first amplified and then differentiated to reflect whether the barometric pressure is falling or rising and signalling the same. The signal is then translated to reflect the direction of trends and displayed to indicate the direction of trend of barometric pressure.

It is another object of my invention to provide for a device that automatically displays the direction of barometric pressure trend to a casual observer.

It is an additional object of my invention to provide display means for indicating direction of barometric pressure trend that is readily understandable to the casual viewer.

It is a further object of my invention to indicate barometric pressure trend in a simple, and economical manner.

BRIEF DESCRIPTION OF THE DRAWING

FIG. 2 is a partially cut away and enlarged illustrative view along line 2—2 of FIG. 1 when the direction of barometric pressure trend is increasing.

FIG. 3 is a partially cut away and enlarged illustrative view along line 2—2 of FIG. 1 when the direction of barometric pressure trend is decreasing.

FIG. 4 is a partially cut away and enlarged view along line 4—4 of FIG. 1.

DESCRIPTION OF THE PREFERRED EMBODIMENT

Figure 1:
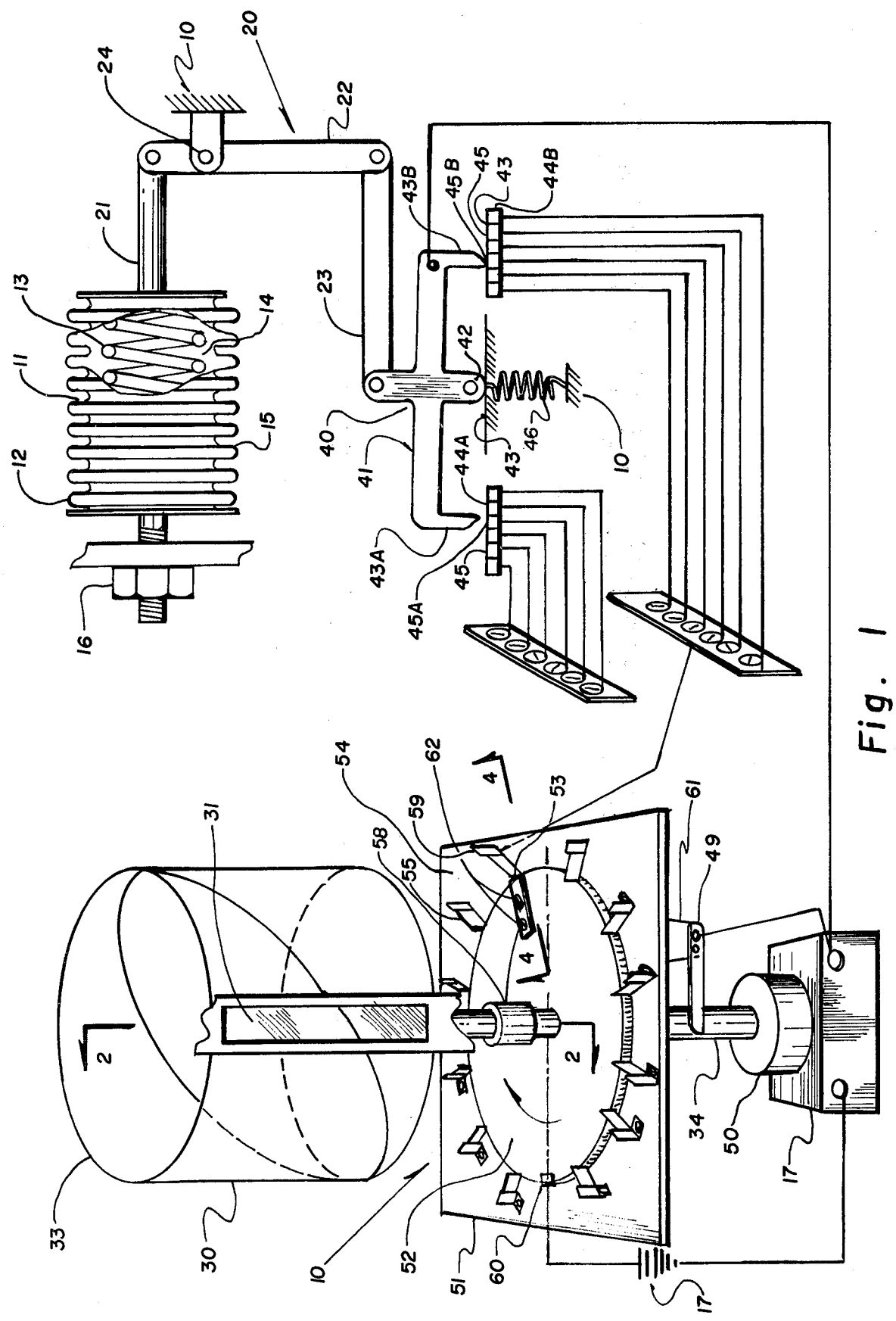
FIG. 1 is a partially cut away illustrative view of the preferred embodiment of my invention showing a device for indicating barometric pressure trends.

Referring to the drawings, FIG. 1 discloses a preferred embodiment of a device for indicating barometric pressure trends with housing 10. Means for measuring barometric pressure 11 is attached to the housing 10 in any conventional manner. Preferably the means for measuring barometric pressure is a bellows 12 containing spring 13 placed in a sealed internal portion 14 while the external portion 15 is exposed to the atmosphere. Altitude adjuster 16 adjusts the movement of the bellows 12 to adjust for changes in altitude. If the altitude increases, ordinarily the atmospheric pressure decreases. The altitude adjustor 16 permits the adjustment of bellows 12 to sea level.

Linkage member 20 amplifies and translates the motion from means for measuring barometric pressure 11 to trend means 40. In the preferred embodiment, linkage member 20 includes link one 21 attached to the bellows 12. Link two 22 is pivotly connected to link one and has a fixed pivot point 24. Link three 23 is pivotly connected to the remaining end of link two 22 and attached to trend means 40. The small amount of motion from bellows 12 is amplified when link two moves across the fixed pivot point 24.

Trend means 40 signals the direction of barometric pressure trend. Trend means 40 is mounted on the housing 10 and controlled by linkage member 20 to send a signal whenever barometric pressure changes.

In the preferred embodiment, trend means 40 includes rocker bar 41 having a pivotal point 42 at its center, a first arm 43A to one side and a second arm 43B to the other side. First contact panel 44A placed below first arm 43A and second contact panel 44B, placed below second arm 43B contain numerous contact points 45. Each contact point reflects an amount of change in barometric pressure.

When bellows 12 increases in size due to decrease in barometric pressure, linkage member 20 forces rocker bar 41 to place first arm 43A at some contact point such as 45A situated on first contact panel 44A. When bellows 12 decreases in size 12 due to increase in barometric pressure, rocker bar 41 forces second arm 43B onto a contact point such as 45B on second contact panel 44B.

It is appropriate that contact points 45 and rocker bar 41 be manufactured out of an electrical conducting material in order to create and conduct an electrical signal whenever the rocker bar 41 touches any contact points 45, such as 45A or 45B.

For ease in use, pivotal point 42 is placed on a sliding surface 43 to permit relatively friction free movement about the pivotal point 42. An adjustable spring 46 is attached to housing 10 and pivotal point 42 to permit the appropriate amount of tension to be selected to adjust the movement about the pivotal point 42.

Motor means 50 energizes display means 30 in such a manner that the signal received by motor means 50 from trend means 40 is translated to energize the display means 30 so that the direction of trend of barometric pressure is indicated.

Display means 30 visually indicates the trend of barometric pressure and may also indicate actual barometric pressure. In the display means 30, a rectangular window 31 is mounted on housing 10. Cylinder 33 is situated behind the window 31 in a manner to permit its rotation. Referring to FIGS. 2 and 3, cylinder 33 is divided into first horizontal portion 35A to show increases in barometric pressure and second horizontal portion 35B to show decrease in barometric pressure.

FIG. 2 shows an increasing barometric pressure trend in progress. Horizontal portion 35A is divided into a bottom portion 36A preferably of a blue color and top portion 37A preferably of a white color, divided by first slant line 38A running from the lower end to the opposite upper end of first horizontal portion 35A. One side of window 31 is calibrated 32 to show actual barometric pressure at the intersection of first slant line 38A and calibration 32. When an observer views window 31 and sees blue, an increasing barometric pressure trend is indicated.

FIG. 3 shows a decreasing barometric pressure trend in progress. Horizontal portion 35B is divided into a bottom portion 36B preferably of a white color and top portion 37B preferably of a red color divided by second slant line 38B running from the lower end to the opposite upper end of the horizontal portion 35B. One side of window 31 is calibrated 32 to show actual barometric pressure at the intersection of second slant line 38B and calibration 32. When an observer views window 31 and sees red, a decreasing barometric pressure trend is indicated.

As shown in in FIG. 1, motor means 49 comprises a motor 50 attached to shaft 34 in order to rotate the shaft, and slide switch rotor 51 connectable to power source 17 in order to activate the motor. Slide switch rotor 51 includes a rotatable disc 52 mounted on shaft 34. The rotatable disc 52 is manufactured of an electrical conducting material and connected to any conventional power source 17 at power connection 60. Stationary spring loaded electrical contacts 53 are placed on mount 54 surrounding rotatable disc 52.

Referring to FIG. 4 as well as 1, the stationary spring loaded electrical contacts 53 have a stationary arm 59 and tension member 55. The tension member 55 touches the rotatable disc 52 in a manner to retain electrical contact with the disc 52 during rotation. Stationary arm 59 is attached mount 54 by any conventional fastening means such as nuts and bolts 63.

Insulator 56 is placed on rotatable disc 52 to break the circuit between the disc 52 and a selected stationary spring loaded electrical contact such as 61. Ground contact 57 is placed on top of insulator 56 and is made of a conductible material. Collar 58 is rotatably mounted on a shaft 34 and electrically connected to ground contact 57 and the shaft 34. Member 61 is connected to mount 54 in order to receive pick-up arm 49. Pick-up arm 49 is associated with shaft 34 and electrically connected to motor 50 in such a manner that when ground contact 57 hits selected stationary spring loaded electrical contact 61, motor 50 is short circuited to stop suddenly.

Referring to FIG. 1, when the barometric pressure drops, the bellows 12 increases in size. Linkage member 20 amplifies the change of size and forces rocker arm 41 to move about pivotal point 42 placing second arm 43B onto second contact panel 44B at contact point 45B. A circuit is then completed from point 60 which is connected to the power source 17, through disc 52, through stationary spring loaded electrical contact 61 which is connected to contact point 45B, through rocker bar 41 and finally to motor 50. Upon completion of the circuit, motor 50 is activated to rotate the shaft 34 along with disc 52 and cylinder 33. The rotation continues until insulator 56 comes in contact with stationary spring loaded electrical contact 61. Insulator 56 breaks the circuit between disc 52 and contact point 45B. The motor 50 is then shorted out between terminals because ground contact 57 completes the circuit between the motor 50, pick-up arm 49, collar 58, ground contact 57, selected spring loaded electrical contact 61, contact point 45B, rocker bar 41 and back to the motor 50 again. The short circuiting of the motor causes the motor to stop quickly without having an inertial drift.

Cylinder 33 is placed on the shaft 34 in such a manner that the rectangular window 31 when viewed by an observer shows a decreasing (red) barometric pressure trend whenever the second arm 43B touches second contact panel, as in FIG. 3. The amount of red shown in rectangular window 31 would be reflected by the top portion 37B above the second slant line 38B. The actual barometric pressure could be read by looking at the intersection 39 between second slant line 38B and calibration side of window 32. When an increase in barometric pressure trend is in progress, bellows 12 decreases in size, causing rocker bar 41 with first arm 43A to rest on a contact point such as 45A situated on first contact panel 44A. The contact point 45A would be connected to one of the stationary spring loaded electrical contacts 53 in a manner to rotate the cylinder to portray increasing barometric pressure trend by operation as previously described.

Increasing barometric pressure trend is indicated as in FIG. 2 wherein an observer would notice a blue color in rectangular calibration side of window 32 at the intersection with first slant line 38A. The amount of blue shown in rectangular window 31 would be reflected by bottom portion 36A below first slant line 38A.

As it may readily appear to those skilled in the art, various changes may be made in relative locations and arrangements of the several parts without departing from the sphere and scope of this invention. It is not meant to limit the invention except by the following claims:

I claim:

1. A device for indicating barometric pressure trends, comprising:
   a. a housing;
   b. means for measuring barometric pressure mounted on the housing;
   c. a linkage member connected to one end of means for measuring barometric pressure;
   d. display means for indicating direction of barometric trend, mounted on the housing;
   e. trend means for determining barometric pressure trend, mounted on the housing and controlled by the linkage member, that creates a signal when trend direction changes; and
   f. motor means for energizing display means, connected to the trend means and display means in such a manner that the signal from trend means is translated by motor means to energize display means so that display means indicates direction of trend of barometric pressure.

2. The device of claim 1 wherein the means for measuring barometric pressure comprises:
a metalic bellows for sensing barometric pressure changes having a spring placed inside a sealed internal portion, while an external portion is exposed to the atmosphere.

3. The device of claim 1 wherein the linkage member comprises:
a. a first link connected to the means for measuring barometric pressure;
b. a second link pivotly attached to one end of the first link and connected to a fixed pivot point; and
c. a third link pivotly attached to one each of the second link and connected to the trend means so that changes in barometric pressure are translated from means for measuring barometric pressure to the trend means.

4. The device of claim 1 wherein display means comprises:
a. a rectangular window mounted on the housing;
b. a cylinder situated behind the display means window, divided into two equally horizontal portions, a first horizontal portion having two color bars to represent increased trend, a blue bottom portion and a white top portion separated by a first slant line running from the lower end to the upper end and a second horizontal portion having two color bars to represent decreasing trend, a white bottom portion and a red top portion separated by a second slant line running from the lower end to the upper end; and
c. a shaft secured to the cylinder, in order to rotate the cylinder so that when viewing through the window the top of the window shows red and bottom white while a falling barometric pressure trend is in progress while the top portion window shows white and bottom blue while an increasing barometric pressure trend is in progress.

5. The device of claim 4 wherein one side of the rectangular window is calibrated so that the first slant line and second slant line reflect the actual barometric pressure at the intersection with the calibrated side of the rectangular window.

6. The device of claim 4 wherein the trend means comprises:

a. a rocker bar having a pivotal point, a first arm and a second arm connected to the linkage member, and connectible to an electrical power source with its pivotal point resting upon a sliding surface to permit relatively friction free movement about the pivotal point;
b. a first contact panel divided into contact points, each point representing 1/100th of an inch increase in barometric pressure between 29.5 and 30.5 inches of mercury;
c. a second contact panel divided into contact points, each point representing 1/100 of an inch increase in barometric pressure between 29.5 and 30.5 inches of mercury; and
d. wherein each of said contact points is connectible to power source to create a signal sent to motor means whenever the rocker arm rests on a contact point.

7. The device of claim 6 wherein the motor means comprises:
a. a motor mounted on the housing and connected to the shaft in order to rotate the shaft with cylinder, connectible to the power source; and
b. a slide switch rotor mounted on the shaft, having a rotatable disc, a stationary spring loaded electrical contacts placed on a mount surrounding the disc and in contact with the disc, wherein each spring loaded electrical contact is connected to a contact point, and an insulator placed on a disc in the manner to break the circuit between the disc and that spring loaded electrical contact energized when an arm of the rocker bar rests on the contact point connected to such spring loaded electric contact.

8. The device of claim 6 further comprising:
an adjustable spring attached to the housing and the pivotal point of the rocker bar, to permit the adjustment of a mounted movement about the pivotal point.

9. The device of claim 8 comprising:
a. a ground contact attached to the top of the insulator in a manner to permit its contact with a stationary spring loaded electrical contact when the disc is rotated; and
b. a collar placed on the shaft and electrically connected to the ground contact on a motor, so that the motor is shorted to stop faster and prevent inertial drift when the insulator touches an energized spring loaded electrical contact.

* * * * *